United States Patent [19]

Cook

[11] Patent Number: 4,560,183

[45] Date of Patent: Dec. 24, 1985

[54] TRAILER HITCH GUIDE

[76] Inventor: Charles E. Cook, Rte. 4, Box 1482-C, Eufaula, Okla. 74432

[21] Appl. No.: 559,956

[22] Filed: Dec. 9, 1983

[51] Int. Cl.$^4$ ............................................. B60D 1/04
[52] U.S. Cl. ...................................... 280/477; 33/264
[58] Field of Search ................... 280/477, 478; 33/264

[56] References Cited

U.S. PATENT DOCUMENTS

| | | | |
|---|---|---|---|
| 1,629,993 | 5/1927 | Williams | 280/477 |
| 2,120,415 | 6/1938 | Meyer | 280/477 |
| 2,703,243 | 3/1955 | Clark | 280/477 |
| 2,920,907 | 1/1960 | Bremer | 280/477 |
| 3,123,380 | 3/1964 | Grim et al. | 280/477 X |
| 3,201,144 | 8/1965 | Smyser | 280/477 |
| 3,325,186 | 6/1967 | Lund | 280/477 |
| 3,420,549 | 1/1969 | Robinson | 280/477 |
| 3,565,459 | 2/1971 | Reid | 280/477 |
| 3,765,703 | 10/1973 | Voelkerding et al. | 280/477 |
| 3,879,062 | 4/1975 | Miller | 280/477 |
| 3,909,033 | 9/1975 | Russell, Jr. | 280/477 |
| 4,226,438 | 10/1980 | Collins | 280/477 |
| 4,254,968 | 3/1981 | Del Vecchio | 280/477 |

Primary Examiner—John A. Pekar
Attorney, Agent, or Firm—Schley, Cantrell, Kice, Garland & Moore

[57] ABSTRACT

A trailer hitch guide constructed in accordance with the present invention mounts a base upon the vehicle hitch and a pair of detachably, mountable, lateral guides are attachable to the base for projecting rearwardly therefrom. A first cam surface is provided which is connectable to said base and a second cam surface is connectable to the trailer tongue. The first and second cam surfaces are formed to cooperate to cause relative vertical displacement between the vehicle hitch and the trailer tongue as the vehicle hitch approaches the trailer tongue. The trailer tongue is aligned in a horizontal plane and raised in a vertical plane during the approach until the socket on the trailer tongue is positioned over the ball hitch. The trailer tongue is then dropped upon the ball hitch engaging the socket over the ball. The lateral guides and cam surfaces are removable as necessary to facilitate freedom of angular movement between the trailer hitch and the trailer tongue.

16 Claims, 7 Drawing Figures

TRAILER HITCH GUIDE

BACKGROUND OF THE INVENTION

Difficulties in both alignment and engagement persist in operations of linking vehicles with trailers. Although a standard hitch has developed, engaging the vehicle's hitch and the trailer tongue continues to present problems.

It is an object of the present invention to provide a trailer hitch guide for guiding in a horizontal plane the joining of a vehicle hitch with a trailer tongue.

It is a further object of the present invention to establish a camming action between the trailer tongue and the vehicle hitch for providing a lifting and dropping action for securing engagement between the trailer tongue and the vehicle hitch.

Finally, it is an object of the present invention to provide a trailer hitch guide which is convenient to use, is easily assembled, and stores out of the way when it is not in use.

SUMMARY OF THE INVENTION

A trailer hitch guide constructed in accordance with the present invention mounts a base upon the vehicle hitch. A pair of detachably mountable lateral guides are attachable to the base to project rearwardly from the vehicle hitch. Further, when mounted, the lateral guides converge in a lateral plane as they approach the vehicle hitch positioned therebetween.

A first cam surface is provided which is connectable to said base and a second cam surface connectable to the trailer tongue is also provided.

The first and second cam surfaces are formed to cooperate to cause relative vertical displacement between the vehicle hitch and the trailer tongue as the vehicle hitch and the trailer tongue approach in horizontal coordinates. The desired vertical displacement for standard ball hitches is to raise the trailer tongue relative to the vehicle hitch during the approach until a socket on the trailer tongue is positioned over the ball hitch and then to permit the trailer tongue to fall upon the ball hitch thereby engaging the socket and ball hitch.

The first cam surface is formed by the upper edges of the paired lateral guides in one embodiment of the present invention. The second cam surface of this embodiment projects transversely across both sides of the trailer tongue.

In another embodiment of a trailer hitch guide constructed in accordance with the present invention, the first cam surface is transversely mounted across the rearwardly terminal ends of the lateral guides and the second cam surface is an inclined ramp connected to the lower side of said trailer tongue.

The convenience of using the present invention is enhanced in both embodiments by positioning a first upwardly projecting sight rod on the base in alignment with the vehicle hitch and a second sight rod projecting upwardly from the trailer tongue.

The trailer hitch guide of the present invention aides in joining a vehicle hitch with a trailer tongue as the vehicle hitch is advanced generally toward the trailer tongue. Precise guiding of the vehicle hitch toward the trailer tongue is accomplished as the trailor tongue comes between a converging pair of lateral guides which project rearwardly from the base attached to the vehicle hitch. In addition, a first cam surface connected to the base moves across a second cam surface connected to the trailer tongue as the vehicle hitch is further advanced and the cam surfaces cooperate to cause the trailer tongue to rise with respect to the vehicle hitch. Once the vehicle hitch is advanced to a position beneath engaging means on the trailer tongue, the first and second camming surfaces cooperate to drop the trailer tongue upon the vehicle hitch thereby securing the trailer to the vehicle.

A BRIEF DESCRIPTION OF THE DRAWINGS

A DETAILED DESCRIPTION OF THE DRAWINGS

Figure 1:
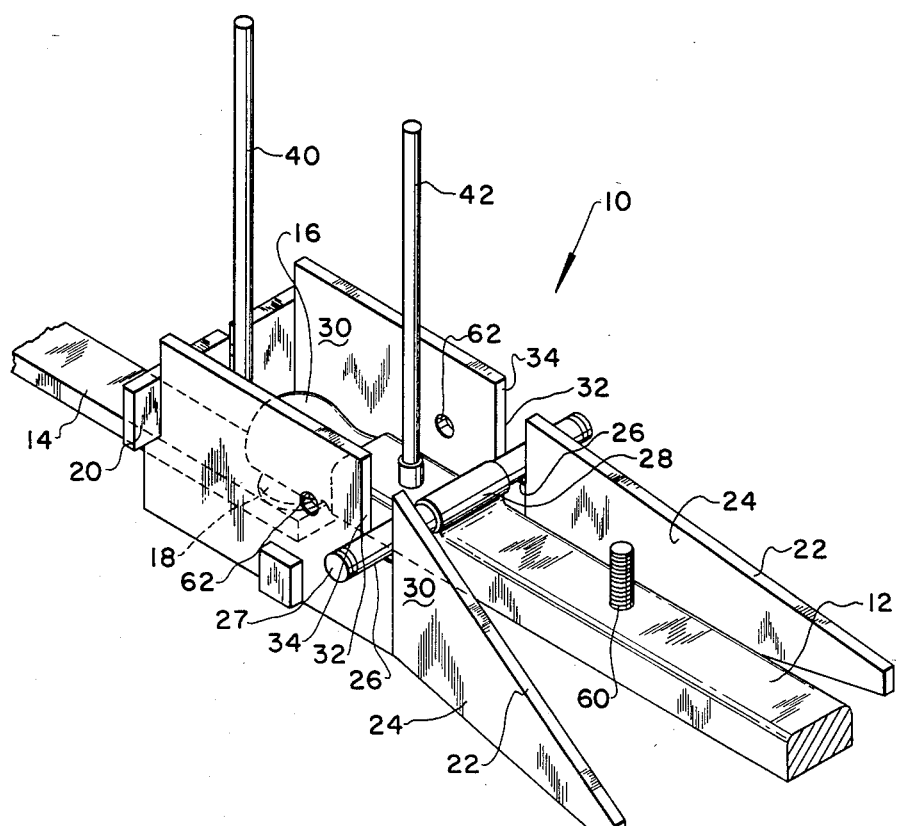
FIG. 1 is a perspective view of a trailer hitch guide constructed in accordance with the present invention.

FIG. 1 is a perspective view of a trailer hitch guide constructed in accordance with the present invention in which the trailer hitch guide assembly is designated generally as trailer hitch guide 10. Trailer hitch guide 10 aides in joining trailer tongue 12 with vehicle trailer hitch 14. Trailer tongue 12 terminates in a downwardly open socket 16 which engages ball 18 carried on vehicle trailer hitch 14 to secure the engagement of a trailer to a vehicle.

In a trailer hitch guide constructed in accordance with the present invention, a base 20 connects to vehicle trailer hitch 14. Base 20 provides means for supporting laterial guides 24 and first cam surfaces 22 discussed more fully below.

Figure 2:
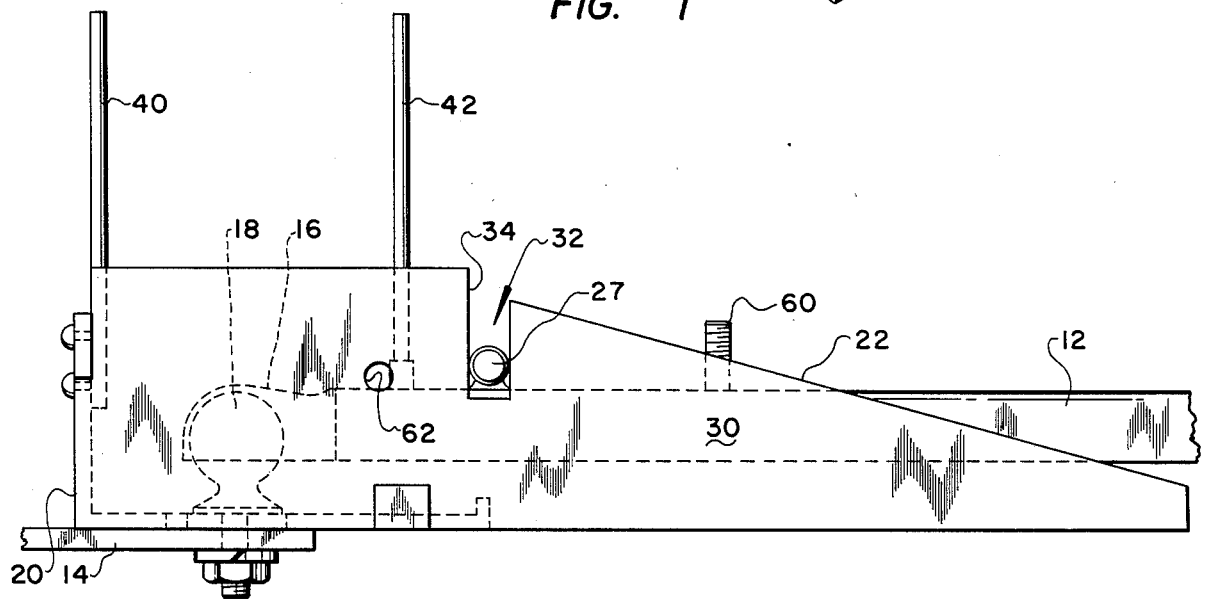
FIG. 2 is a side-plane view of a trailer hitch guide constructed in accordance with the present invention in which certain hidden members are shown in dotted outline.

Please refer to FIGS. 1 and 2 throughout the discussion of the first preferred embodiment. In this embodiment, lateral guides 24 and first cam surfaces 22 are provided by detachable side plates 30 where first cam surfaces 22 are provided by the upper edges of lateral guides 24.

Second cam surfaces 26, which register with said first cam surfaces to achieve a vertical displacement therebetween are provided by roller 27 which projects transversely from the trailer tongue to which it is rotatably mounted through sleeve 28.

Upper edges 22 of lateral guide 24 form an inclined ramp which terminates at coupling notch 32. In addition, it is preferred that the far side of coupling notch 32 provide a safety stop 34 which is discontinuous with ramp 30 to facilitate the engagement of roller 26 into coupling notch 32.

The inclusion of sight rods 40 and 42 enhances the ease in which the trailer tongue and vehicle trailer hitch are aligned for engagement. Thus, first sight rod 40 projects upwardly from the base to which it is removably attached and sight rod 42 is removably mounted upon trailer tongue 12.

Figure 3:
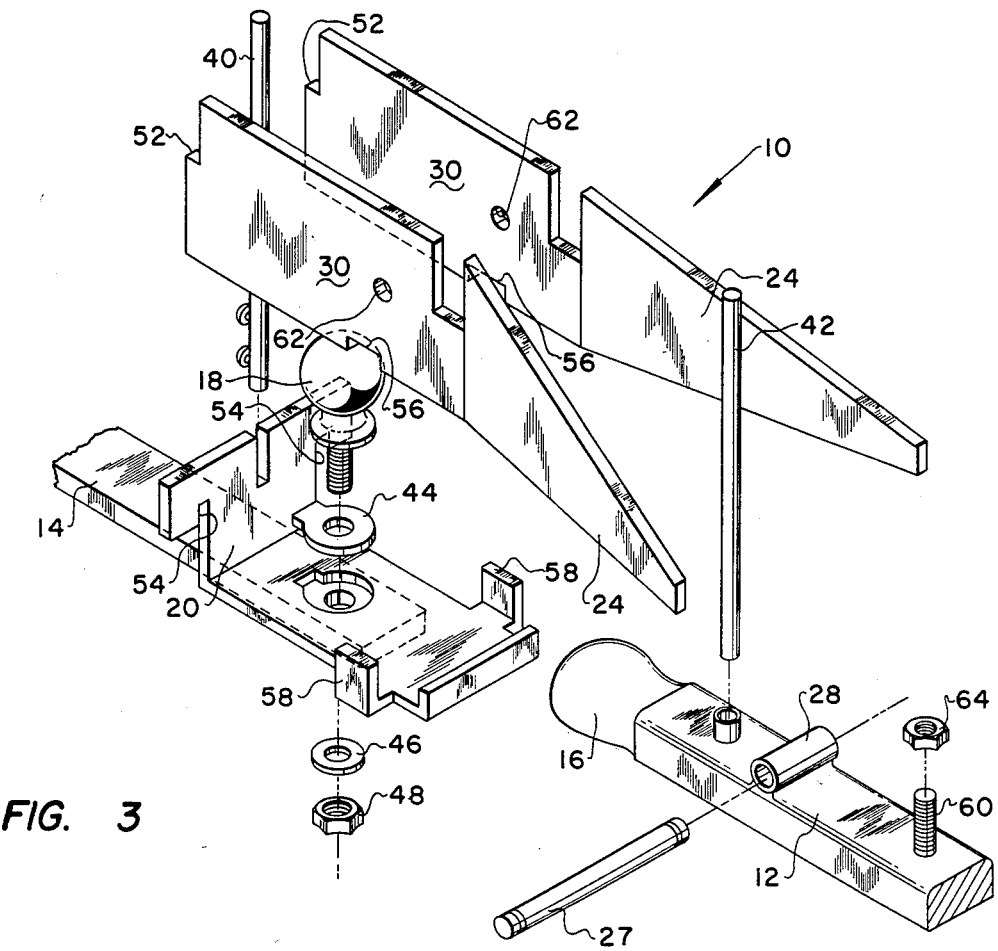
FIG. 3 is an perspective view of the disassembled elements of a trailer hitch guide constructed in accordance with the present invention.

FIG. 3 best illustrates how the various elements of trailer hitch guide 10 are assembled into the first embodiment. Here, base 20 is mounted to vehicle trailer hitch 14 through ball 18 engaging a keyed anti-jackknife washer 44 as held in place by washer 46 and nut 48. In this embodiment, lateral guides 24 are part of side plates 30 which extend from the rearward projection of first cam surfaces to cantilever notches 52 which engage slots 54 in base 20. To further secure engagement of side plates 30 to base 20, the base plates have a fulcrum notch 56 with a bottom edge thereof which seats about arms 58 extending from base 20.

FIG. 3 shows clearly trailer hitch guide 10 is providing convenient disassembly without tools in which only base 20 remains in place. Thus, side plates 30 are easily disengaged, sight rods 40 and 42 are removable from the base and the trailer tongue, respectively, and roller 27 is easily removed from the trailer tongue. The remaining base 20 presents no difficulties with respect to the freedom of movement of trailer tongue 12 in relation to vehicle trailer hitch 14.

Figure 4:
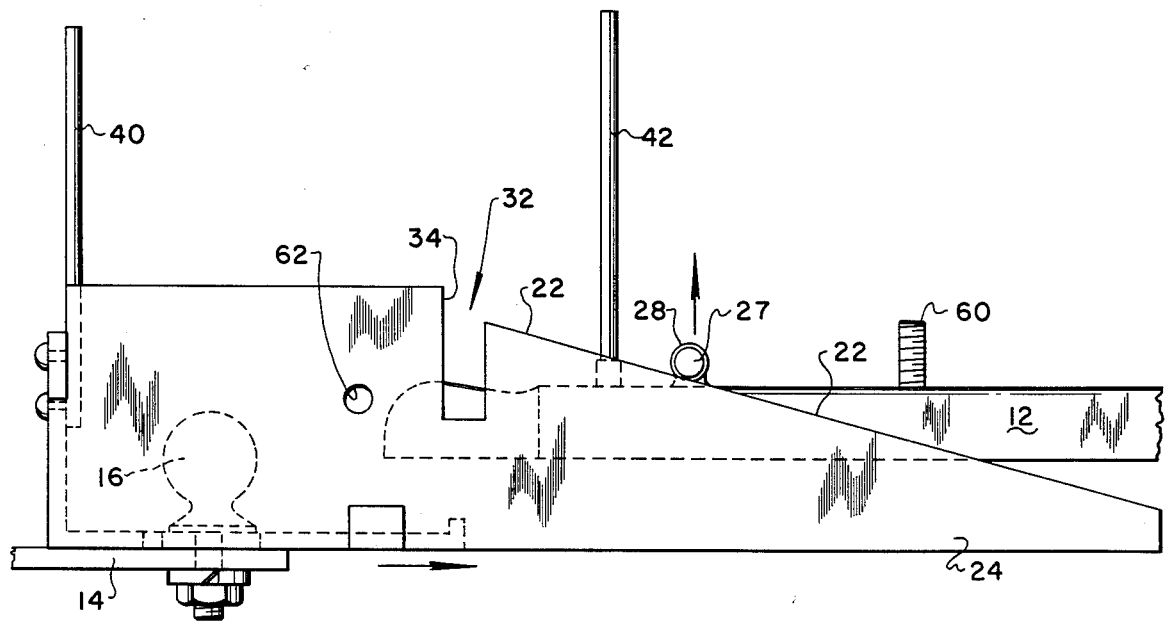
FIG. 4 is a side-elevational view of a trailer hitch constructed in accordance with the present invention as the trailer hitch is moving toward engagement.

FIG. 4 is a side view showing the vertical camming action of trailer hitch guide 10 as vehicle trailer hitch 14 approaches trailer tongue 12. The vehicle is backed up and sight rods 40 and 42 aid in advancing vehicle hitch generally toward the trailer tongue such that the trailer tongue comes between the flared ends of lateral guides 24. These lateral guides converge toward ball 16 of vehicle hitch 14 to ensure proper horizontal alignment.

The vertical lifting of trailer tongue 12 which causes socket 16 to be brought over ball 18 and then dropped into place is provided by the camming of a first cam surface provided by the upper edges 22 of lateral guides 24 on side plates 30. The second cam surface is provided in this embodiment by roller 27 which is rotatably mounted transversely across tongue 12 through sleeve 28. The extended edges of roller 26 ride on top of the advancing ramp 24, thereby lifting trailer tongue 12 with respect to vehicle hitch 14 until roller 26 comes to termination of ramp 24 at coupling notch 32. It is further convenient to provide a safety stop 34 to ensure that roller 27 does not skip over coupling notch 32.

Thus, the first and second camming surfaces provided by upper edge 22 and roller 27, respectively, cooperate to drop the trailer tongue upon the vehicle hitch as necessary to engage the trailer to the vehicle. In conventional trailer systems, this means dropping socket 16 on to ball 18.

Once the connection is made, the elements of the trailer hitch guide are easily removed without the necessity of any tools. Further, it is convenient to store side plates 30 on trailer tongue 12 by mounting the side plates over screw 60 through holes 62 on the base plate and secure these with nut 64. See FIG. 3.

Figure 5:
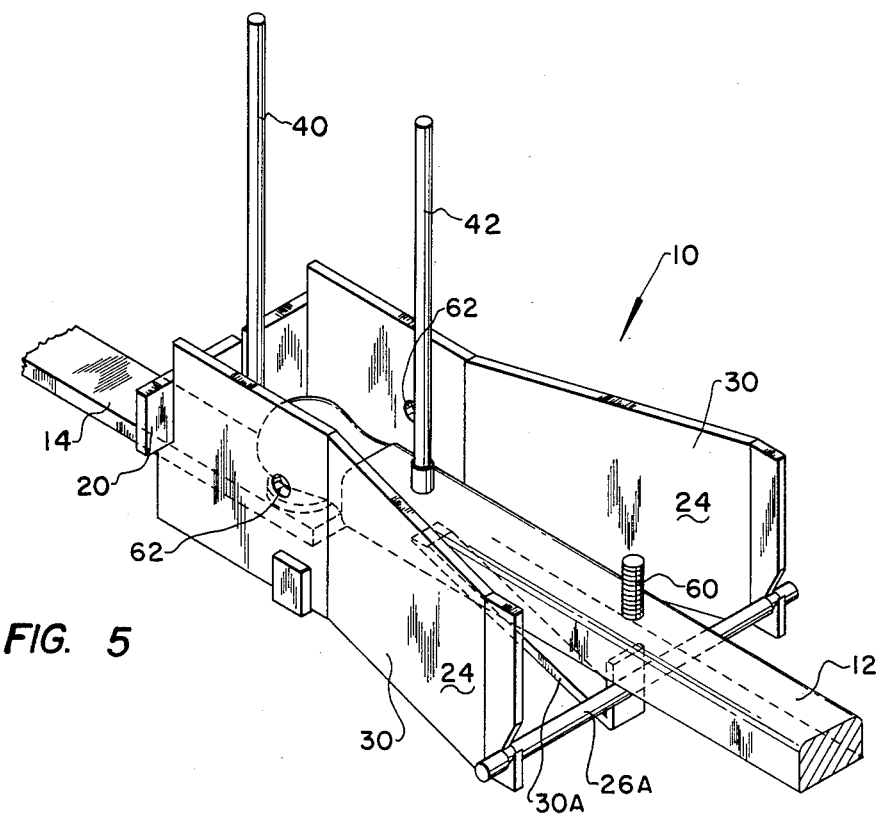
FIG. 5 is a perspective view of an alternative embodiment of a trailer hitch guide constructed in accordance with the present invention, this illustration also showing some hidden elements in dotted outline.

FIG. 5 introduces an alternative embodiment of trailer hitch guide 10. In this emodiment, plates 30 are similarly attached to base 20 connected to vehicle hitch 14. However, in this embodiment, roller 22a is rotatably attached across the projected diverging edges of lateral guides 24 and provides the first cam surface. Ramp 26a is downwardly oriented from beneath trailer tongue 12 to provide the second cam surface.

Figure 6:
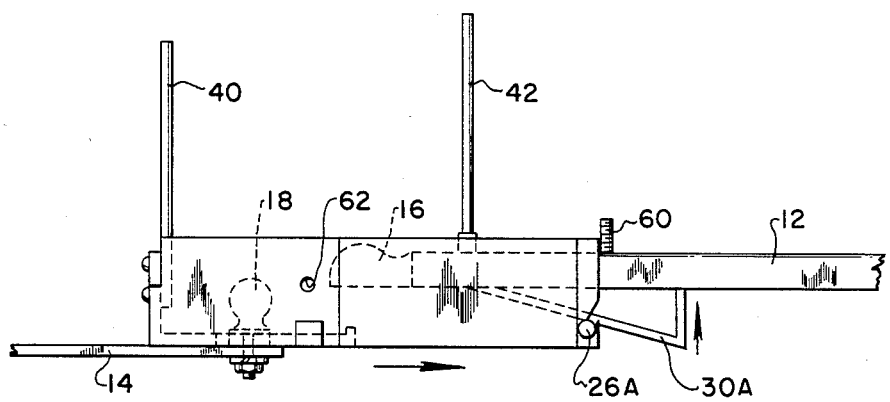
FIG. 6 is a side-elevational view of an alternative embodiment of a trailer hitch guide approaching engagement.
Figure 7:
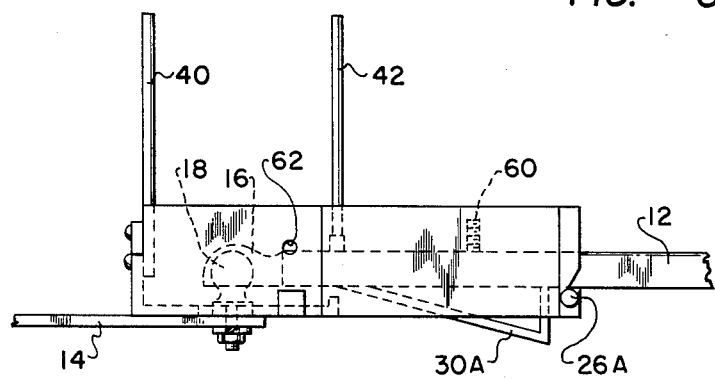
FIG. 7 is a side-elevational view of a alternative embodiment of a trailer hitch constructed in accordance with the present invention.

FIGS. 6 and 7 illustrate the use of this trailer hitch guide embodiment. In FIG. 6, vehicle hitch 14 is advanced toward trailer tongue 12 causing ramp 26a to ride up roller 22a during this advancement. At the terminal end of ramp 36a, socket 16 is over ball 18 and it is dropped thereon as the ramp-to-tongue support comes to an end.

Roller 22a is then disengaged from across the ends of side plates 30 which are disconnected from base 20 to provide for maximum freedom of movement and angular flexibility of trailer tongue 12 with respect to vehicle hitch 14. Further, it is preferred that sight rods 40 and 42 be removed prior to use in towing.

Although the invention has been described and illustrated with a certain degree of particularity, it is understood that the present disclosure has been made by way of example only and that numerous changes in details of construction in combination and in arrangement of parts may be resorted to without departing from the spirit and scope of the invention as hereinafter claimed.

I claim:

1. A trailer hitch guide for guiding the joining of a vehicle trailer hitch with a trailer tongue, said trailer hitch guide comprising:
   a base connectable to said vehicle trailer hitch;
   a first cam surface removably connectable to said base;
   a second cam surface connectable to said trailer tongue, said first and second cam surfaces cooperating to cause relative vertical displacement between the tongue and the vehicle trailer hitch as they approach in a horizontal plane, this vertical displacement operating to secure the trailer tongue to the vehicle trailer hitch;
   a pair of lateral guides attachable to said base and converging across a substantial horizontal plane at the vehicle trailer hitch;
   wherein said first cam surface is formed by the upper edges of said pair of lateral guides.

2. A trailer hitch guide in accordance with claim 1 wherein said second cam surfaces formed by a roller rotatably attachable to said trailer tongue and projecting transversely from either side thereof.

3. A trailer hitch guide constructed in accordance with claim 2 wherein said trailer hitch guide further comprises a transverse sleeve through which said roller is rotatably mounted.

4. A trailer hitch guide for guiding the joining of a vehicle trailer hitch with a trailer tongue, said trailer hitch guide comprising:
   a base connectable to said vehicle trailer hitch;
   a first cam surface removably connectable to said base;
   a second cam surface connectable to said trailer tongue, said first and second cam surfaces cooperating to cause relative vertical displacement between the tongue and the vehicle trailer hitch as they approach in a horizontal plane, this vertical displacement operating to secure the trailer tongue to the vehicle trailer hitch;
   a pair of lateral guides attachable to said base and converging across a substantial horizontal plane at the vehicle trailer hitch;
   wherein said pair of lateral guides each further comprises:
   a coupling notch at the inclined terminal end of said ramp for effecting lowering of said tongue onto said hitch;

a safety stop at the end of the coupling notch;
means for removably mounting said lateral guide to said base.

5. A trailer hitch guide in accordance with claim 4 wherein said means for detachably mounting said lateral guide to said base further comprises:
a base plate connected to said ramp and defining said coupling notch between said base plate and said ramp;
a cantilever notch cut from said base plate at the forward edge thereof;
and a fulcrum notch cut from said base plate on the bottom edge thereof forward of said ramp.

6. A trailer hitch guide for guiding the joining of a vehicle trailer hitch with a trailer tongue, said trailer hitch guide comprising:
a base connectable to said vehicle trailer hitch;
a first cam surface removably connectable to said base;
a second cam surface connectable to said trailer tongue, said first and second cam surfaces cooperating to cause relative vertical displacement between the tongue and the vehicle trailer hitch as they approach in a horizontal plane, this vertical displacement operating to secure the trailer tongue to the vehicle trailer hitch;
a pair of lateral guides attachable to said base and converging across a substantial horizontal plane at the vehicle trailer hitch;
wherein said first cam surface is a roller rotatably attachable across said pair of lateral guides at the rearward ends thereof.

7. A trailer hitch guide in accordance with claim 6 wherein said second cam surface is a ramp formed beneath said trailer tongue.

8. A trailer hitch guide for guiding the joining of a vehicle trailer hitch with a trailer tongue, said trailer hitch guide comprising:
a base connectable to said vehicle trailer hitch;
a pair of lateral guides attachable to said base and converging across a substantially horizontal plane at the vehicle trailer hitch, each said lateral guide comprising:
means for connecting said lateral guide to said base;
an inclined upper edge;
a coupling notch at the elevated terminal end of said inclined upper edge;
a safety stop at the far side of said coupling notch; and
a roller rotatably attachable to said trailer tongue and projecting transversely from either side thereof;
whereby said roller rolls up the inclined upper edges of said lateral guides as the vehicle trailer hitch and the trailer tongue converge, said roller dropping into the coupling notch at the elevated terminal end of the inclined upper edge, said coupling notches forcing an orientation of the roller and thereby of the trailer tongue.

9. A trailer hitch guide in accordance with claim 8 wherein said means for connecting said lateral guide to said base plate includes:
a base plate connected to said ramp;
a cantilever notch engageable with said base;
a folcrum notch engageable with said base.

10. A trailer hitch guide in accordance with claim 9 wherein said trailer hitch guide further comprises means connectable to said trailer tongue for storing said lateral guides when they are detached.

11. A trailer hitch for guiding a trailer tongue into proper engagement with a ball hitch, said hitch guide comprising:
a base connectable to said ball hitch;
a left lateral guide attachable to said base to project rearwardly therefrom;
a right lateral guide attachable to said base to project rearwardly therefrom, said left and right lateral guides rearwardly diverging;
a forwardly inclining ramp surface formed on the top edges of said left and right lateral guides;
a roller rotatably connected to said tongue and engageable upon said ramp surface;
a terminal end of said ramp positioned allow the roller to drop and the tongue attached thereto thereby fall into proper engagement with the ball.

12. A trailer hitch guide in accordance with claim 11 further comprising:
a first sight rod projecting upwardly from said base; and
a second sight rod projecting upwardly from said trailer hitch tongue.

13. A trailer hitch guide constructed in accordance with claim 11 wherein said left and right lateral guides are detachable from said base.

14. A trailer hitch guide constructed in accordance with claim 11 wherein said roller is detachable from said tongue.

15. A trailer hitch guide constructed in accordance with claim 11 further comprising a means for storing said left and right lateral guides on said tongue.

16. A trailer hitch guide for guiding a trailer tongue in the proper alignment with a ball hitch, said hitch guide comprising:
a base connectable to said ball hitch;
a left lateral guide attachable to said base to project rearwardly therefrom;
a right lateral guide attachable to said base to project rearwardly therefrom, said left and right lateral guides rearwardly diverging;
a roller bar rotatably connected transversly across the rearward ends of said left and right lateral guides;
a ramp surface connectable to said trailer hitch.

* * * * *